United States Patent
Winkelmann

[15] 3,689,955
[45] Sept. 12, 1972

[54] WINDOW WIPER SYSTEM
[72] Inventor: Herbert E. Winkelmann, Kettering, Ohio
[73] Assignee: General Motors Corporation, Detroit, Mich.
[22] Filed: May 12, 1971
[21] Appl. No.: 142,521

[52] U.S. Cl. .................... 15/250.3, 91/218, 91/337
[51] Int. Cl. ........................ B60s 1/10, F01l 15/00
[58] Field of Search .......... 15/250.1, 250.26, 250.29, 250.3; 91/218, 337, 346

[56] References Cited

UNITED STATES PATENTS

| | | |
|---|---|---|
| 1,661,134 | 2/1928 | Folberth et al. ....... 15/250.3 X |
| 1,913,308 | 6/1933 | Hueber et al. ........ 15/250.3 X |
| 2,251,240 | 7/1941 | Kellogg .................... 91/337 X |
| 2,421,194 | 5/1947 | Given, Jr. ................ 91/218 X |

*Primary Examiner*—Peter Feldman
*Attorney*—W. E. Finken and W. A. Schuetz

[57] ABSTRACT

In a preferred form, this disclosure relates to a window wiper system for wiping a window of an automotive vehicle. The window wiper system includes a fluid motor having a cylinder and a piston reciprocable therein and which divides the cylinder into a first and second chambers; a wiper supported for movement in an oscillatory manner across the window, a drive transmission for oscillating the wiper in response to reciprocation of the piston; and a valve means which controls the operation of the fluid motor. The valve means includes a housing which defines a valve chamber and has apertures communicating the valve chamber with the atmosphere, a fluid pressure source, and the first and second chambers of the fluid motor. The valve means has a valve member which is shiftable between first and second positions to alternately communicate the atmosphere and the fluid pressure source to the first and second chambers of the fluid motor to effect reciprocation of the piston. The valve member is shiftable between its first and second positions by a valve actuator which comprises a Y-shaped actuator and a bowed leaf spring. The Y-shaped actuator is supported for pivotal movement and is engageable with the valve member. The bowed leaf spring effects rapid pivotal movement of the Y-shaped actuator when it is moved over center in response to reciprocation of the piston by a cam connected to the drive transmission.

3 Claims, 5 Drawing Figures

INVENTOR.
Herbert E. Winkelmann
BY
W. A. Schuetz
ATTORNEY

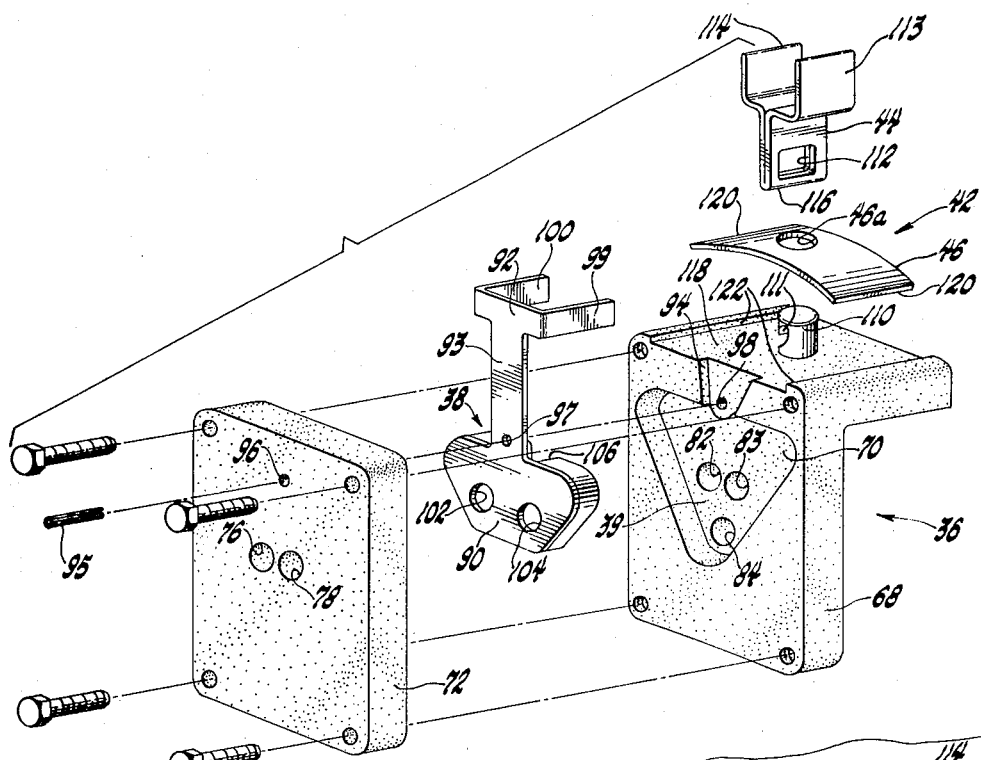
Fig. 3
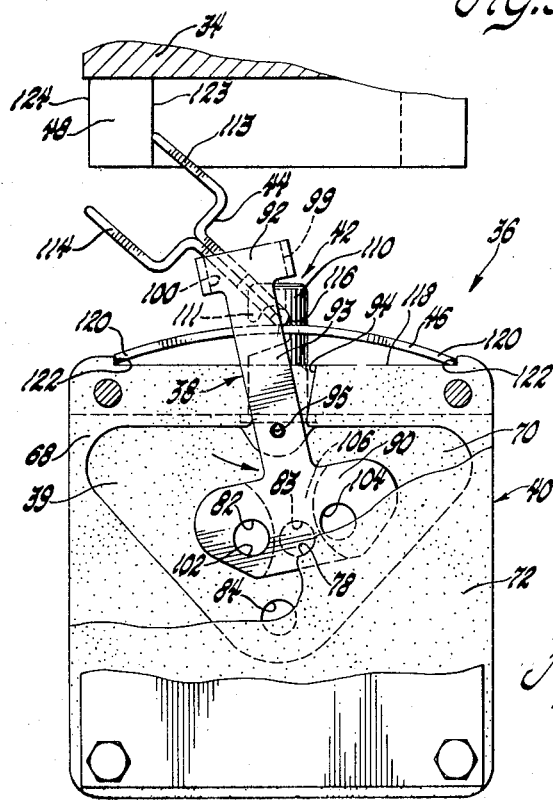
Fig. 4
Fig. 5
INVENTOR.
Herbert E. Winkelmann
BY
W. A. Schuetz
ATTORNEY

WINDOW WIPER SYSTEM

The present invention relates to a window wiper system, and more particularly to a window wiper system for cleaning the rear window of a station wagon vehicle.

Heretofore, window wiper systems having a reciprocating piston type fluid motor for oscillating a window wiper via a drive transmission operatively connected with the wiper and motor have been provided. These systems have also included a valve means actuated in response to the reciprocating movement of the piston for alternately communicating the atmosphere and a fluid pressure source with the fluid motor to effect reciprocation of the piston. Examples of such systems are shown in U.S. Pat. Nos. 2,045,861; 2,069,016 and 2,265,842.

The present invention is directed to a new and improved window wiper system of the above noted type and which is of a compact and economical construction.

Accordingly, an important object of the present invention is to provide a new and improved window wiper system of the type referred to above and which is of a compact and economical construction.

Another object is to provide a new and improved window wiper system, preferably for wiping a rear window of a station wagon vehicle, wherein the system includes a fluid motor having a cylinder with a piston reciprocable therein and which divides a cylinder into first and second chambers, an oscillatory wiper for wiping the window, a drive transmission for oscillating the wiper in response to reciprocation of the piston, a valve means for alternately communicating the first and second chambers of the fluid motor with the atmosphere and the fluid pressure source to effect reciprocation of the piston of the fluid motor, and in which the valve means includes a valve actuator having a pivotally supported Y-shaped actuator which is biased by a bowed leaf spring to either a first or second position and which is shifted from one position toward its other position in response to reciprocation of the piston by a cam carried by the drive transmission and with the bowed leaf spring functioning to rapidly shift the Y-shaped actuator when the latter is moved overcenter by the cam means.

Another object is to provide a new and improved window wiper system as defined in the preceding objects and wherein the valve means comprises a housing having a valve chamber with apertures in communication with the atmosphere, the fluid pressure source, and the first and second chambers of the fluid motor, and a valve member shiftable between two positions by the valve actuator for alternately aligning a pair of spaced holes with respective ones of the apertures to alternately communicate the atmosphere and the fluid pressure source with the two chambers of the fluid motor.

Briefly, the above and other objects of the present invention are achieved, in the preferred embodiment, by providing a window wiper system which includes a fluid motor comprising a cylinder with a piston reciprocable therein and which divides the cylinder into first and second chambers; a wiper supported for oscillatory movement across window while in engagement therewith; and a drive transmission which connects the fluid motor with the wiper. The drive transmission comprises a rack which is attached to the piston and which rotates a rotatably supported pinion gear to which the wiper is secured. The window wiper system further includes a valve means which controls the operation of the fluid motor and which comprises a valve housing having apertures therein for communicating the atmosphere with a valve chamber. The valve means further comprises a valve member having a pair of passages therethrough and which is shiftable between first and second positions for alternately communicating the atmosphere and the vacuum source with the first and second chambers of the fluid motor to effect reciprocation of the piston. The valve member is shifted between its first and second positions by a valve actuator which comprises a Y-shaped actuator supported for pivotal movement and a bowed leaf spring which constantly biases the Y-shaped actuator toward either a first or second position. The bowed leaf spring effects rapid shifting of the Y-shaped actuator between its positions upon movement of the Y-shaped member overcenter in response to reciprocation of a cam attached to the reciprocable rack of the drive transmission.

The aforementioned and other objects of the invention will become more fully apparent from the following description and drawing wherein:

FIG. 3 is an exploded view of a valve means used in the window wiper system shown in FIG. 2;

FIG. 4 is an end elevational view of the valve means shown in FIG. 3; and

FIG. 5 is a view similar to that shown in FIG. 4 with different parts thereof shown in different position.

Figure 1:
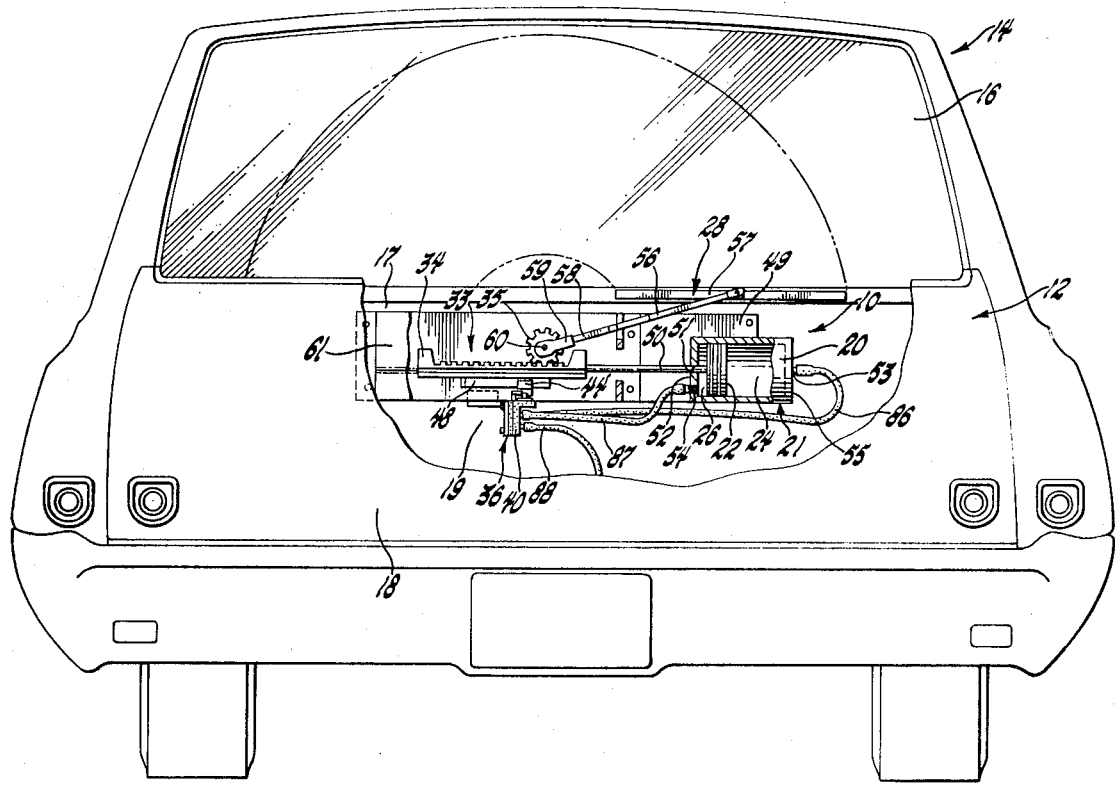
FIG. 1 is a fragmentary rear elevational view of a station wagon vehicle embodying the novel window wiper system of the present invention.

As representing a preferred embodiment of the present invention, the drawings show a window wiper system 10 suitably mounted within a tailgate 12 of a station wagon vehicle 14 for cleaning the rear or tailgate window 16. The rear window 16 is supported by the tailgate 12 for movement between closed and opened positions. The tailgate 12 has spaced inner and outer panels 17 and 18 which define an open top compartment 19 in which the wiper system 10 is housed.

The window wiper system 10 broadly comprises a fluid motor 21 including a cylinder 20 having a piston 22 reciprocable therein and which divides the cylinder 20 into first and second chambers 24 and 26; a wiper 28 supported for oscillatory movement across the rear window 16; a drive transmission 33 including a rack 34 and pinion gear 35 for oscillating the wiper 28 in response to the reciprocation of the piston 22 within the cylinder 20; and valve means 36 having a valve member 38 shiftable between first and second positions within a valve chamber 39 of a valve housing 40 for controlling the operation of the fluid motor 21 by alternately communicating the atmosphere and a fluid pressure source with the first and second chambers 24 and 26 of the cylinder 20. The valve means 36 includes a valve actuator 42 for rapidly shifting the valve member 38 between its first and second positions and which comprises a Y-shaped actuator 44 which is biased to either a first or second position by a bowed leaf spring 46 which effects rapid shifting movement of the Y-shaped actuator 44 when it is moved overcenter with respect to the bowed leaf spring 46. The Y-shaped actuator 44 is shifted between its first and second positions by a cam 48 attached to the drive transmission 33 in response to reciprocation of piston 22.

Referring to FIG. 1, the fluid motor 21 is suitably supported by a panel 49 secured to the outside panel 18 of the tailgate 12 and comprises the enclosed cylinder 20 and piston 22. The piston 22 is reciprocable within the cylinder 20 and serves to divide the cylinder 20 into first and second sealed chambers 24 and 26. The fluid motor 18 further comprises a piston rod 50 which is fixedly attached to one end of the piston 22 and which extends through an opening 51 in an end wall 52 of the cylinder 20. The first and second chambers 24 and 26 of the cylinder 29 are in communication with ports 53 and 54 formed in the end walls 55 and 52, respectively, of the cylinder 20.

Figure 2:
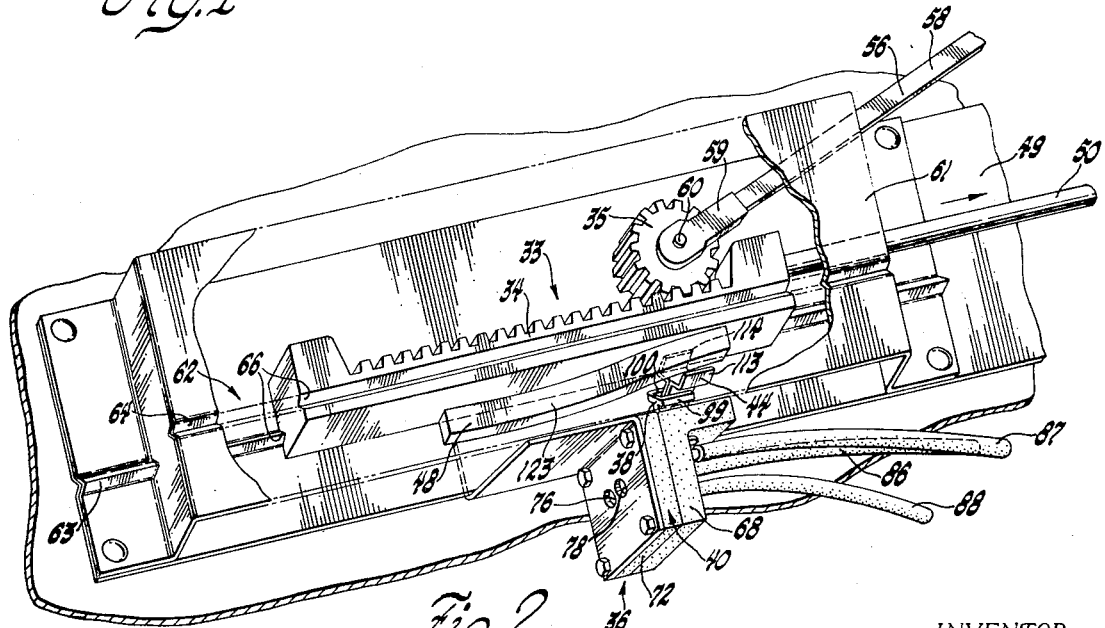
FIG. 2 is an enlarged fragmentary perspective view of the window wiper system of the present invention.

Referring to FIGS. 1 and 2, with window wiper 28 comprises a wiper arm 56 and a wiper blade assembly 57 which is supported at the upper end of the wiper arm 56. The wiper arm 56 includes spring hinged connected upper and lower sections 58 and 59 for biasing the wiper blade assembly 57 into engagement with the rear window 16.

The wiper 28 is adapted to be oscillated across the rear window 16 by the drive transmission 33 in response to reciprocation of piston 22. The lower section 59 of the wiper arm 56 is suitably mounted to one end of a shaft 60 rotatably supported by the panel 49. Fixed to the shaft 60 is the pinion gear 35 which is in meshed engagement with the rack 34. The rack 34 has one end fixedly attached to the piston rod 50 which extends outwardly of cylinder 20 and into a compartment defined by the panel 49 and a bracket 61 secured to the panel 49, the compartment also housing the drive transmission 33. Reciprocation of the piston 22 within the cylinder 20 reciprocates the rack 34 which in turn rotates the pinion gear 35 in opposite directions to oscillate the wiper 28 across the rear window 16.

The rack 34 is guided during reciprocation by a guide means 62. The guide means 62 comprises a pair of longitudinally extending linear ribs 63 and 64. The rib 63 is formed integral with the inside of the panel 49, and the rib 64 is formed integral with the inner side of the bracket 61. The ribs 63 and 64 are received in linearly extending grooves 66 in the opposite sides of the rack 34 and thereby serve to guide the rack 34 for linear movement in opposite directions.

Operation of the fluid motor 18 is controlled by the valve means 36. As best shown in FIGS. 2 and 3, the valve means 36 is mounted to the panel 49 and bracket 61 and is disposed immediately below the rack 34 of the drive transmission 33. The valve means 36 serves to alternately communicate the first and second chambers 24 and 26 of the fluid motor 18 with the atmosphere and a vacuum pressure source (not shown). This effects reciprocation of the piston 22 within the cylinder 20 by virtue of the pressure differential across the piston 22.

The valve means 36 includes a valve housing 40 comprising a base plate 68 with a triangularly shaped cavity 70 therein and an end plate 72 which is suitably attached to one side of base plate 68 and over cavity 70 to define the enclosed valve chamber 39 within the valve housing 40. The end plate 72 has first and second spaced apertures 76 and 78 therethrough which serve to communicate the atmosphere with the enclosed valve chamber 39. The base plate 68 of the valve housing 40 has first, second, and third ports or nipples 82–84. The first port 82 is in communication with the valve chamber 30 and the port 53 of the first chamber 24 of the fluid motor 18 via a conduit 86. The second port 83 is in communication with the valve chamber 39 and the port 54 of the second chamber 26 of the fluid motor 18 via a conduit 87. The third port 84 is in communication with the valve chamber 39 and a vacuum source, preferably the intake manifold of the vehicle's engine, via a conduit 88. The ports 82 and 83 are aligned with the ports 76 and 78, respectively, in the end plate 72. Thus, the valve chamber 39 is in communication with the atmosphere, the first chamber 24, the second chamber 26, and the vacuum source.

The valve means 36 also includes the valve member 38 which has lower and upper portions 90 and 92 disposed internally and externally of the valve chamber 39, respectively. The valve member 38 also has a straight center portion 93 between the upper and lower portions 90 and 92 and which is disposed in a vertically extending tapered slot 94 in the base plate 68 of the valve housing 40, the slot 94 being in communication with the valve chamber 39 and the atmosphere. The valve member 38 is pivotally supported by a pivot pin 95 which is received within hole 96 of end plate 72, hole 97 through the center portion 93 of the valve member 38, and hole 98 at the bottom of the tapered slot 94 of the base plate 68 The upper portion 92 of the valve member 38 has a pair of spaced extensions or arms 99 and 100 which extend perpendicular to the center portion 93. The lower portion 90 of the valve member 38 is disposed within the valve chamber 39 and extends perpendicular to the center portion 93. The lower portion 90 has a pair of spaced holes 102 and 104 which extend therethrough.

The valve member 38 is pivotally movable between first and second positions, as shown in FIGS. 4 and 5 respectively. When the valve member 38 is in its first position, hole 102 aligns with aperture 76 and the first port 82 to communicate the atmosphere with the first chamber 24 of the fluid motor 18, and hole 104 is not aligned with aperture 78 and port 83 whereby the lower portion 90 of the valve member 38 blocks communication between the atmosphere and the second chamber 26 of the fluid motor 18. The blocking of aperture 78 by the lower portion 90 provides for vacuum pressure to be applied to the second chamber 26 of the fluid motor 18 via the second and third ports 83 and 84, the valve chamber 39, and a slot 106 between the spaced apertures 102 and 104 in the lower portion 90 of the valve member 38. When the valve member 38 is in its second position, as shown in FIG. 5, hole 104 aligns with aperture 78 and the second port 83 to communicate the atmosphere with the second chamber 26 of the fluid motor 18, and the hole 102 is not aligned with the aperture 76 and the port 82 whereby the lower portion 90 of the valve member 38 blocks communication between the atmosphere and aperture 76. Thus, vacuum pressure is communicated to the first chamber 24 via the first and third ports 82 and 84, the valve chamber 39, and slot 106. Therefore, the shifting of the valve member 38 between its first and second positions alternately communicates the atmosphere and the vacuum pressure source with chamber 24 and 26 of the fluid motor 18 to effect reciprocation of the piston 22.

The valve means 36 further includes a valve actuator means 42 for rapidly shifting the valve member 38 between its first and second positions. The valve actuator means 42 is fixedly mounted upon the base plate 68 of the valve housing 40 and comprises a Y-shaped actuator 44 which is pivotally supported by a stationary pivot pin 110 suitably mounted to the base plate 68 of the valve housing. To this end, the pivot pin 110 has a hook shaped upper end 111 which is received within a through opening 112 in the lower end of the actuator 44. The other end of the Y-shaped actuator 44 is bifurcated to define a pair of arms 113 and 114 which straddle an S-shaped cam member 48 secured to the underside of the rack 34 of the drive transmission 33, as viewed in FIG. 2. The Y-shaped actuator 44 extends between the spaced extensions 99 and 100 of the valve member 38 and its lower portion is engageable with those extensions.

The Y-shaped actuator 44 is adapted to be pivotally moved about pivot pin 110 between first and second positions, as shown in FIGS. 4 and 5 respectively, When moved toward its first and second positions, the Y-shaped actuator 44 engages the extensions 99 and 100 to move the valve member 38 toward its first and second positions, respectively.

The Y-shaped actuator 44 is adapted to be rapidly shifted between its first and second positions by a bowed leaf spring 46. The bowed leaf spring 46 engages the lower end 116 of the Y-shaped actuator 44 and biases the latter to either its first or second position. The bowed leaf spring 46 also effects rapid pivotal movement of the Y-shaped actuator 44 when the latter is moved overcenter with respect to the bowed leaf spring 46. The bowed leaf spring 46 is a rectangularly shaped strip of suitable material, for example spring steel, which is positioned lengthwise across the width of a shallow groove 118 in the upper portion of the base plate 68. The opposite ends 120 of the spring 46 engage the side walls 122 of the base plate defining the shallow groove 118, and because the overall width of the groove 118 is less than the overall length of the spring 46, the engagement of the ends 120 of the spring 46 with the side walls 122 places the spring 46 in a bowed position. The stationary pin 110 extends through an opening 46a in the leaf spring 46 and serves to retain the leaf spring 46 on the base plate 68. The bowed leaf spring 46 also serves to maintain the lower end 116 of the actuator within the hook shaped end portion 111 of the pin 110.

The Y-shaped actuator 44 of the valve actuator 42 is moved overcenter in opposite directions by the S-shaped cam 48, as shown in FIG. 2. The cam 48 is fixedly attached to the bottom of the rack 34 of the drive transmission 33 and is reciprocated therewith in response to the movement of the piston 22. The cam 48 has a pair of complementary, S-shaped cam surfaces 123 and 124 which extend between and are engageable with the arms 113 and 114, respectively, of the Y-shaped actuator 44 when the cam 48 is reciprocated. With piston 33 in its extreme leftward position in cylinder 20 and the valve actuator 42 and valve member 38 in their second positions as shown in FIG. 5, rightward movement of piston 22 results in cam surface 124 camming arm 114 of the Y-shaped actuator 44 to gradually move the valve actuator 44 as the rack 34 and cam 48 move to a position overcenter with respect to the bowed leaf spring 46. This occurs when the piston 22 nears its extreme righthand position within cylinder 20. Upon being moved overcenter the bias of the bowed leaf spring 46 against the lower end 116 of the Y-shaped actuator 44 causes the Y-shaped actuator 44 to rapidly pivot toward its first position, as shown in FIG. 4. As the Y-shaped actuator 44 is rapidly pivoted by the bowed leaf spring 46, it engages extension 100 to rapidly pivot the valve member 38 from its second position, as shown in FIG. 5, toward its first position, as shown in FIG. 4, as the piston 22 reaches its extreme righthand position within cylinder 20. Similarly, when the cam 48 and rack 34 are moved leftward from the extreme righthand position reached when piston 22 is positioned at the righthand end of cylinder 20, the cam surface 123 cams the arm 113 to gradually move the Y-shaped actuator 44 to an overcenter position with respect to the bowed leaf spring 46. This occurs when the piston 22 nears its extreme lefthand position within cylinder 20. The bias of the bowed leaf spring 46 then causes the Y-shaped actuator 44 to be snapped toward its second position. The Y-shaped actuator 44 will engage extension 99 of the valve member 38 during its rapid movement toward its second position and thereby rapidly pivot the valve member 38 to its second position as the piston 22 reaches its extreme lefthand position within the cylinder 20.

In operation with the valve member 38 in its first position as shown in FIG. 4 and the piston 22 in its extreme righthand position within cylinder 20, the atmosphere communicates with the first chamber 24 of the fluid motor 18 via the aperture 76, the hole 102, the port 82, the passage line 86, and the port 52. Simultaneously, the lower portion 90 of the valve member 38 is blocking aperture 78, and the vacuum source is communicating with the second chamber 26 of the fluid motor 18 via the passage line 88, the third port 84, the valve chamber 39, the second port 83, the passage line 87, and the port 54. The pressure differential across the piston 22 drives the piston and the rack 34 to the left which rotates the pinion gear 35 in a clockwise manner and pivots the wiper 28 in a rightward manner across the rear window 16. As the piston 22 and the rack 34 move to the right, the cam 48 is gradually moving the Y-shaped actuator 44 to a position overcenter with respect to the bowed leaf spring 46 whereupon the spring 46 rapidly pivots the actuator 44 toward its second position. During this movement the actuator 44 engages the valve member 38 and both are rapidly pivoted to their second positions, as shown in FIG. 5. This occurs as the piston reaches its extreme lefthand position within cylinder 20.

Also, the wiper 28 has been pivoted to an extreme lower position on the righthand side of the rear window 16, as shown in FIG. 1.

The shifting of the valve member 38 to its second position reverses the communication of the atmosphere and the vacuum pressure source to the first and second chambers 24 and 26 of the fluid motor 18. The atmosphere now communicates with the chamber 26 via the aperture 78, the hole 104, the second port 83, the passage line 87, and the port 54. The vacuum source then communicates with the chamber 24 via the passage line 88, the third port 84, the valve chamber 39, the first port 82, the passage line 86, and the port 52. The resulting pressure differential across piston 22 drives the piston 22 rightward within cylinder 29 and pivots the wiper 28 in a counterclockwise manner across the rear window 16. As the piston 22 and rack 34 move rightward, the cam 48 moves the actuator 44 to an overcenter position with respect to the bowed leaf spring 46 whereupon the bias of the spring 46 rapidly pivots the actuator toward its first position. During this movement the actuator 44 engages the valve member 38 and both are rapidly pivoted to their first positions, as shown in FIG. 4. This occurs as the piston 22 reaches its extreme righthand position within cylinder 20. This again reverses the communication of the atmosphere and the vacuum pressure source with the first and second chambers 24 and 26 of the fluid motor 18. In this manner, the window wiper system 10 continuously oscillates the wiper 28 across the rear window 16 in response to the reciprocation of the piston 22 within the cylinder 20.

Actuation and de-actuation of the wiper system is preferably controlled by a suitable or conventional manually manipulatable control valve (not shown) for controlling communication between the vacuum source and the valve chamber 39.

The foregoing disclosure relates to only one embodiment of the invention which may be modified within the scope of the appended claims.

What is claimed is:

1. A window wiper system for wiping a window of an automotive vehicle comprising; a fluid pressure source; fluid motor means comprising a cylinder and a piston which is reciprocable therein and which divides said cylinder into first and second chambers; a wiper including a wiper arm supported for oscillatory movement across the window and a flexible wiper blade attached to said wiper arm and engageable with the window; a drive transmission operatively connected with said piston and said wiper arm for effecting oscillatory movement of said wiper arm in response to reciprocation of said piston; valve means for controlling the operation of said fluid motor means, said valve means including a housing defining a valve chamber and having apertures therethrough for communicating the atmosphere with said valve chamber, said valve means also including passages for communicating said valve chamber with said fluid pressure source and said first and second chambers of said fluid motor means, said valve means having a valve member shiftable between first and second positions for alternately communicating the atmosphere and said fluid pressure source to said first and second chambers to effect reciprocation of said piston; valve actuator means for rapidly shifting said valve member between said first and second positions; said valve actuator means comprising a Y-shaped actuator supported for pivotal movement between two positions and which is engageable with said valve member; said valve actuator means further comprising a bowed leaf spring which constantly biases said Y-shaped actuator to one of said two positions and effects rapid pivotal movement of said Y-shaped actuator to the other of said two positions when said Y-shaped actuator is moved overcenter; and cam means connected to said drive transmission and engageable with said Y-shaped actuator for moving said Y-shaped actuator overcenter in response to reciprocation of said piston.

2. A wiper system for wiping the rear window of a station wagon vehicle comprising; a vacuum pressure source; vacuum actuated motor means comprising a cylinder and a piston which is reciprocable therein and which divides said cylinder into first and second chambers; a piston rod fixedly attached to said piston and extending outwardly of said cylinder; a wiper including a wiper arm supported for oscillatory movement across said rear window and having a flexible wiper blade attached to said wiper arm and engageable with said rear window; a drive transmission for oscillating said wiper, said drive transmission comprising a pinion gear supported for rotation in opposite directions and having one end of said wiper arm attached thereto, said drive means further comprising a rack intermeshed with said pinion gear and attached to said piston rod for reciprocating with said piston; valve means for controlling the operation of said vacuum actuated motor means, said valve means including a base plate and an end plate defining an enclosed valve chamber therebetween, said end plate having first and second spaced apertures for communicating the atmosphere with said valve chamber, said base plate having a first port for communicating said valve chamber with said first chamber of said cylinder, said base plate having a second port for communicating said valve chamber with said second chamber of said cylinder, said base plate having a third port for communicating said valve chamber with said vacuum pressure source, said valve means also including a valve member having portions internally and externally of said valve chamber and being pivotally supported between said base and end plates for movement between first and second positions, the internal portion of said valve member having first and second spaced holes therethrough, said valve member when in its first position having said first hole aligned with said first aperture and said first port to provide communication between the atmosphere and said first chamber and blocking said second aperture to provide for communication between said vacuum pressure source and said second chamber via said valve chamber and said second and third ports, said valve member when in its second position having said second hole aligned with said second aperture and said second port to provide for communication between said second chamber and the atmosphere and blocking said first aperture to provide for communication between said vacuum pressure source and said first chamber via said valve chamber and said first and third ports, the external portion of said valve member having a pair of parallel spaced extensions; snap acting valve actuator means engageable with said parallel spaced extensions of said valve member for rapidly shifting said valve member between said first and second positions; and cam means mounted to said rack for moving said valve actuator means in response to reciprocation of said piston.

3. A wiper system for wiping the rear window of a station wagon vehicle comprising; a vacuum source; a vacuum actuated motor means comprising a cylinder and a piston which is reciprocable therein and which divides said cylinder into first and second chambers; a piston rod fixedly attached to said piston and extending outwardly of said cylinder; a wiper including a wiper arm supported for oscillatory movement across said window and having a flexible wiper blade attached to said wiper arm and engageable with said rear window; a drive transmission for oscillating said wiper arm comprising a pinion gear supported for rotation in opposite directions and having one end of said wiper arm fixedly attached thereto, said drive transmission further comprising a rack intermeshed with said pinion gear and attached to said piston rod for reciprocating with said piston; valve means for controlling the operation of said vacuum actuated motor means, said valve means including a base plate and an end plate defining an enclosed valve chamber therebetween, said end plate having first and second spaced apertures for communicating the atmosphere with said valve chamber, said base plate having a first port for communicating said valve chamber with said first chamber of said cylinder, said base plate having a second port for communicating said valve chamber with said second chamber of said cylinder, said base plate having a third port for communicating said valve chamber with said vacuum pressure source, said valve means also including a valve member having portions internally and externally of said valve chamber and being pivotally supported between said base and end plates for movement in opposite directions between first and second positions, The internal portion of said valve member having first and second spaced holes therethrough, said valve member when in its first position having said first hole aligned with said first aperture and said first port to provide for communication between the atmosphere and said first chamber and blocking said second aperture to provide for communication between said vacuum pressure source and said second chamber via said valve chamber and said second and third ports, said valve member when in its second position having said second hole aligned with said second aperture and said second port to provide for communication between said second chamber and the atmosphere and blocking said first aperture to provide for communication between said vacuum pressure source and said first chamber via said valve chamber and said first and third ports, said valve member having a pair of parallel spaced extensions on the external portion; valve actuator means mounted on said valve means for rapidly shifting said valve member between said first and second positions, said valve actuator means comprising a Y-shaped actuator supported for pivotal movement between two positions and which is engageable with said parallel spaced extensions of said valve member, said valve actuator means further including a bowed leaf spring which constantly biases said Y-shaped actuator to one of said two positions and effects rapid pivotal movement of said Y-shaped actuator to the other of said two positions when said Y-shaped actuator is moved overcenter; and cam means carried by said rack for moving said Y-shaped actuator overcenter in response to reciprocation of said piston.

* * * * *

UNITED STATES PATENT OFFICE
CERTIFICATE OF CORRECTION

Patent No. 3,689,955   Dated September 12, 1972

Inventor(s) Herbert E. Winkelmann

It is certified that error appears in the above-identified patent and that said Letters Patent are hereby corrected as shown below:

Column 3, line 16, "cylinder 29" should read --cylinder 20--.
Column 4, line 7, "chamber 30" should read --chamber 39--.
Column 5, line 67, "piston 33" should read --piston 22--.
Column 7, line 8, "cylinder 29" should read --cylinder 20--.

Signed and sealed this 13th day of February 1973.

(SEAL)
Attest:

EDWARD M. FLETCHER, JR.
Attesting Officer

ROBERT GOTTSCHALK
Commissioner of Patents